Dec. 5, 1939.   C. W. COLLINS   2,182,250
BRAKE MECHANISM
Filed June 6, 1938
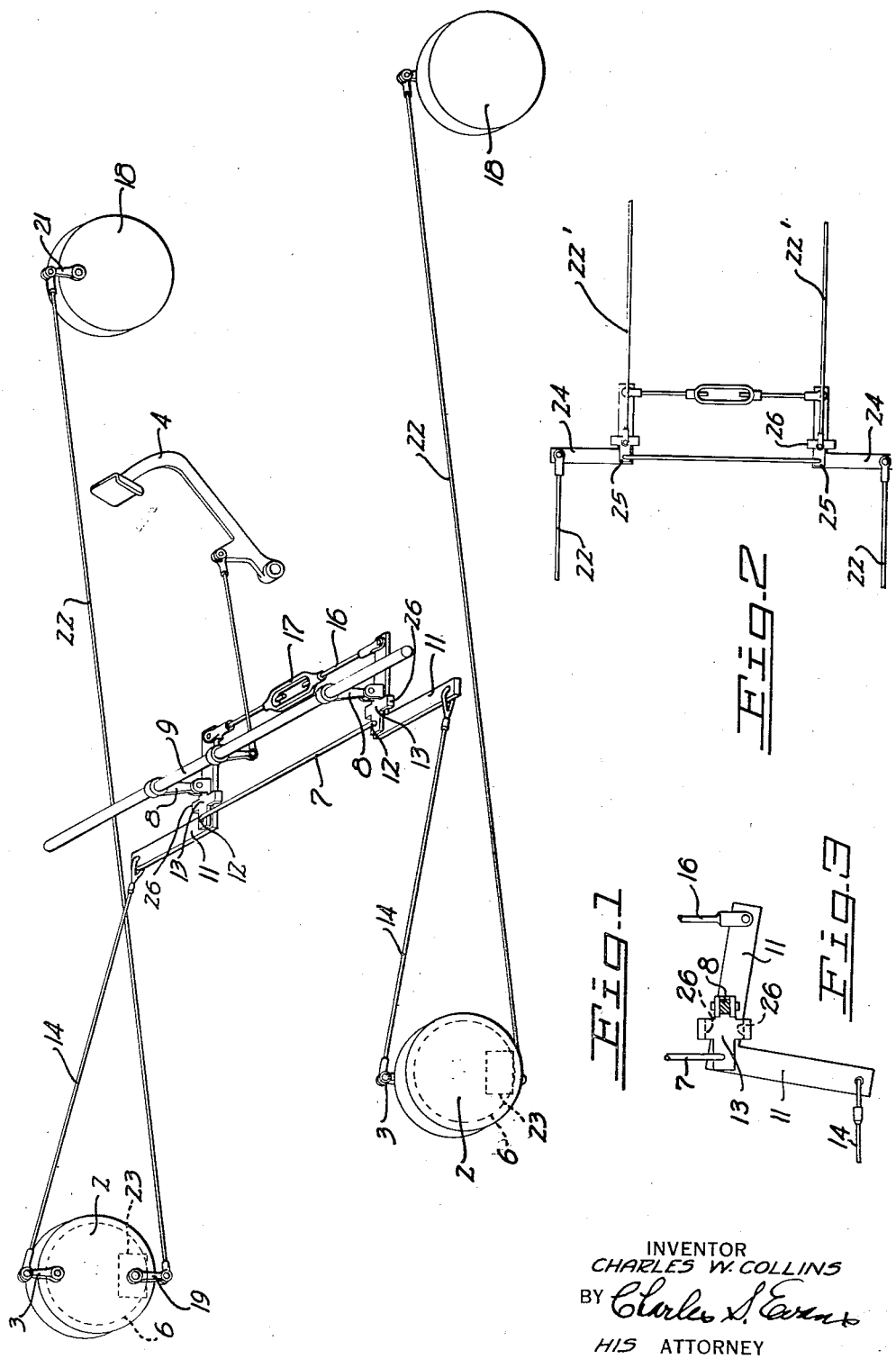
INVENTOR
CHARLES W. COLLINS
BY Charles S. Evans
HIS ATTORNEY Patented Dec. 5, 1939

2,182,250

UNITED STATES PATENT OFFICE 2,182,250

BRAKE MECHANISM

Charles W. Collins, Seattle, Wash.

Application June 6, 1938, Serial No. 212,058

4 Claims. (Cl. 188—204)

My invention relates to a braking system for vehicles; and the broad object of the invention is to provide an improved equalizing mechanism for such a system.

Another object of the invention is to provide an equalizer which operates to set at least one of the brakes, even though a part of the mechanism breaks and renders another of the brakes inoperable.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a perspective view of a brake mechanism embodying the improvements of my invention;

Figure 2 is a plan view of an equalizer for the front brakes; and

Figure 3 is a fragmentary plan view on an enlarged scale showing an equalizer arm in abutment with a stop on the mechanism.

In terms of broad inclusion, my mechanism includes rear wheel brakes, and means for equalizing the forces applied to operate the brakes. The rear brakes also preferably include means for actuating front wheel brakes, and means are preferably provided for equalizing the braking force applied to the front brakes. The preferred equalizer comprises a spreader bar connected with the brake operating means and carrying equalizing arms pivotally connected together and to the rear brakes.

In greater detail, and referring to Figure 1 of the drawing, the brake mechanism of my invention comprises rear wheel brakes 2 having levers 3 connected to a suitable brake operating means, such as the foot pedal 4. The rear brakes are preferably of a type, such as shown in my patent, No. 2,070,984, issued February 16, 1937, in which the braking force is derived from a clutch 6 engageable with the brake drum. In other words, lever 3 engages the clutch and the torque of the clutch plate is then utilized to engage the brake band, as fully described in the patent above referred to.

In my present invention, means are provided for equalizing the operating forces applied to brake clutches 6 from foot pedal 4. For this purpose a floating spreader bar or rod 7 is suspended by levers 8 depending from the usual rocker bar 9. Equalizing arms 11 are pivoted to the spreader bar on pins 12 preferably formed by the downturned ends of the bar. Levers 8 are preferably pivotally connected to the spreader bar at these pivot points, by suitable shackles 13 also engaging the downturned ends of the bar.

Equalizing arms 11 are preferably shaped as bell-cranks, with the two legs of the arms disposed at substantially right angles. One end or leg of each arm is substantially parallel with the spreader bar and the other end or leg is substantially perpendicular to the bar, in the normal positions of the crank arms. The ends of the arms which are substantially parallel with the bar preferably project outwardly, and the other ends preferably project forwardly of the bar. The pivots 12 are positioned at the centers or angles of the crank arms, so that shackles 13 overlie the forwardly projecting ends of the arms. The outwardly projecting end of each arm is connected to the brake lever 3 of one of the brakes by a suitable rod 14. The other ends of the equalizing arms are pivotally connected together by a cross bar or rod 16 extending substantially parallel to spreader bar 7. Connecting rod 16 is preferably made adjustable as to length by a turnbuckle 17, so that all the slack in the mechanism may be taken up.

By this arrangement it will be seen that the entire equalizer moves forward when foot pedal 4 is depressed, causing brake rods 14 to tension and rotate levers 3 to engage clutches 6. If one clutch requires less movement of its lever 3 to effect engagement than the other clutch, the equalizing arms 11 rotate to take up the difference, so that both clutches are engaged uniformly and are subjected to equal operating forces. This insures equal brake band engaging action in both of the rear wheel brakes.

Front wheel brakes 18 are also preferably provided, and are preferably actuated by the same clutches 6 which actuate the rear brakes. As described in my above mentioned patent, a lever 19 is provided on the rear brake for movement by the clutch, and this lever in turn is connected to the front brake lever 21 by a suitable rod or cable 22.

Means are also preferably provided for equalizing the brake actuating forces applied from the rear brakes to the front brakes. If desired, an equalizer such as indicated diagrammatically at 23 may be incorporated directly in the rear brake drum. Such an equalizer is shown in my above mentioned patent. Or, an external equalizer, such as shown herein for the rear brake clutches, may be interposed in the rods 22 leading to the front brakes. Figure 2 shows such an arrangement with the portions of rods 22 coming from the rear brakes connected to the outer ends of equalizer arms 24; and the portions of rods 22′ leading to the front wheel brakes connected to the intermediate arm pivots 25.

Another important feature of my improved equalizers is that at least one of the brakes remains operable should a part of the mechanism become broken or disconnected. Thus if one of the rods or cables 14 be disconnected, the equalizer arms 11 will rotate until they abut stops 26 on shackles 13. Continued forward movement of the equalizer as a whole will then tension the other cable 14 to apply the brake. Likewise, if one of the equalizing arms 11 be broken, or if the cross rod 16 be broken or disconnected, the other equalizing arm will still be effective to operate its brake after the arm reaches the limit of its rotation against the stop 26 provided on shackle 13. Figure 3 shows one of the equalizing arms 11 turned into abutment with a stop 26, as would happen if the cross rod 16 or the opposite cable 14 were broken; and this figure shows that bell-crank 11 is limited by stop 26 against further clockwise rotation so that further forward movement of shackle 13 will set the brake.

The rotational movement required of arms 11 for the equalizing action is relatively small. Therefore arms 11 do not have to turn much before they strike stops 26, so that a cable 14 will not slacken enough to prevent setting a brake, should a part of the equalizer be broken.

In regard to the equalizing action, it will be noted that the pivots 12 are disposed at the centers or angles of the right angle bell-cranks 11; so that when the crank arms 11 rotate to take up slack in one of the cables 14, the effective lever arms which apply the operating forces to the brakes are always equal. In other words, the equalizer is always in balance as far as the application of force to each of the brakes is concerned; and for any given position of the equalizing arms, the actuating force applied to one brake is equal to that applied to the other.

I claim:

1. In a vehicle having a pair of brakes and means for operating them, an equalizer comprising a floating spreader bar connected for movement with the operating means, a pair of equalizing arms pivoted to the bar, means connecting the arms for pivotal movement together, and means connecting each arm to a brake.

2. In a vehicle having a pair of brakes and means for operating them, an equalizer comprising a spreader bar, a pair of equalizing arms pivoted to the bar, means pivotally fastened to an end of each arm for connecting the latter to a brake, a rod pivotally fastened to the other ends of the arms for connecting them together, means for adjusting the length of said connecting rod, and means connecting said bar for movement with the operating means.

3. In a vehicle having a pair of brakes and means for operating them, said operating means having a pair of depending levers, an equalizer comprising a spreader bar suspended by said levers, a pair of equalizing arms pivoted to the bar, means connecting an end of each arm to a brake, and means pivotally connecting the other ends of the arms together.

4. In a vehicle having a pair of brakes and means for operating them, an equalizer comprising a spreader bar connected for movement with the operating means, a pair of equalizing arms pivoted to the bar, means connecting the arms for pivotal movement together, means connecting each arm to a brake, and stops for limiting rotational movement of said equalizing arms.

CHARLES W. COLLINS.